Nov. 12, 1957   A. QUINCHE ET AL   2,812,548
MOLD FOR PLASTIC COLLAPSIBLE CONTAINERS
Filed March 23, 1953
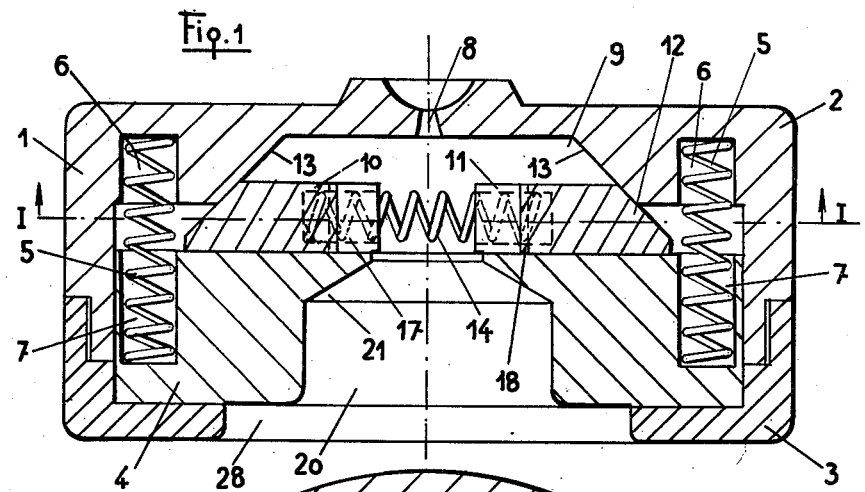
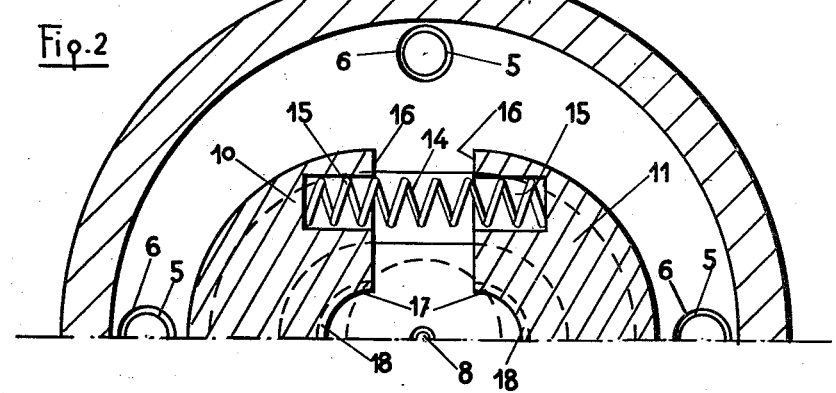
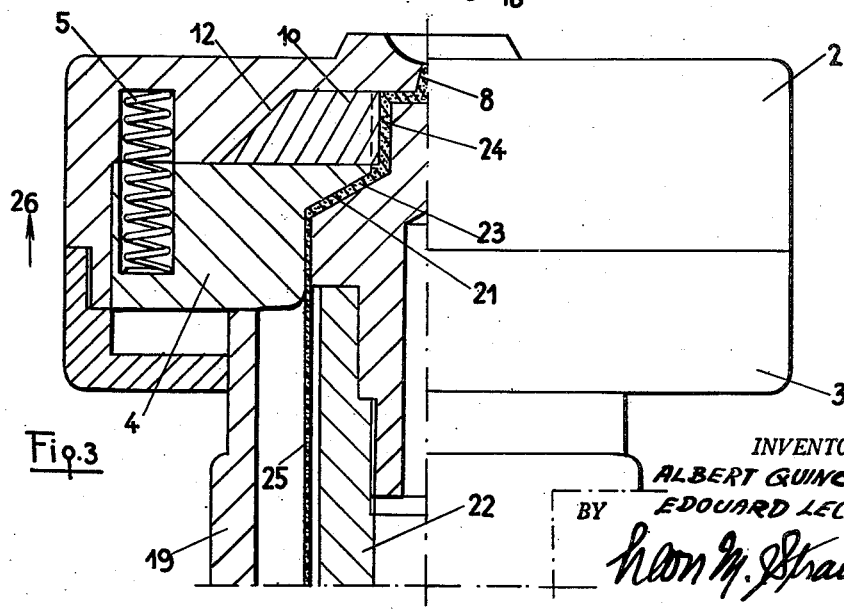
INVENTORS:
ALBERT QUINCHE
EDOUARD LECLUYSE
BY
AGT.

2,812,548

MOLD FOR PLASTIC COLLAPSIBLE CONTAINERS

Albert Quinche, Saint Sulpice, near Lausanne, and Edouard Lecluyse, Vevey, Switzerland, assignors to Uni-Tubo S. A., Vevey, Switzerland Application March 23, 1953, Serial No. 344,156

5 Claims. (Cl. 18—42)

Our invention has for its object a mold for plastic material and, according to a primary object of our invention, said mold includes a casing inside which at least one member is fitted slidingly against the action of at least two springs, said member being adapted, when shifted by a ram or pusher member, to stress said springs and to shift at least two chills or half-molds housed inside the casing with a view to urging them towards each other, said chills being adapted to cooperate for molding purposes when in contact with each other while they move automatically apart so as to release the molded article when the member controlling their movement towards each other ceases operating.

We have shown by way of example in accompanying drawings a preferred embodiment of a mold according to our invention. In said drawings:

Fig. 1 is a transverse sectional view;

Fig. 2 is a partial sectional view through line I—I of Fig. 1;

Fig. 3 is a partial sectional view through the die during the molding operation.

The mold illustrated includes a casing 1, the two cylindrical sections 2 and 3 of which are screwed together and house a member 4 adapted to slide therein against the action of four springs 5 acting in the direction opposed to the forward movement of said member. One end of each of said springs is fitted inside a corresponding recess 6 in the cylindrical casing section 2, while the other end of each spring engages an annular groove 7 in the member 4.

The casing section 2 is provided outwardly with a port 8 for the introduction of the material to be molded and inwardly with a recess 9 registering with said port and inside which are housed two cooperating chill molds 10 and 11 the periphery of which assumes the shape of a sloping surface 12; the slope of the latter matches that of the lateral sloping wall 13 of the recess 9; the chills 10 and 11 carry, in blind holes 15 provided for this purpose in the surfaces of the chills that face each other, two springs 14 urging said chills apart; the chills engage each other along flat surfaces 16 adapted to cooperate during the molding operation while recesses 17 formed in said chills are provided with a common thread as shown at 18; these recesses 17 are adapted to shape a part of the outer surface of an article to be molded.

The section 3 of the casing is provided with a large opening 28 for the passage therethrough of a pusher member 19 adapted to push the sliding member 4 inwardly, said sliding member 4 being provided inwardly with a housing 20 coaxial with the chill recesses 17; the wall 21 of said housing cooperates in the molding operation; said housing is adapted to receive a punch 22 secured to the pusher member 19 and engaging coaxially the bore in the latter.

The mold illustrated, that is more particularly intended for shaping the end 24 of a tube 23 made of plastic material and having a lateral wall 25, operates as follows:

The punch 22 rigid with the pusher member 19 and carrying the tube wall 25 is introduced into the housing 20 of the member 4, the port being positioned in register with the injection channel injecting polyethylene or another suitable plastic material; this being performed, the punch 22 is submitted to the action of a hydraulic press which urges the member 4 in the direction of the arrow 26, whereby the chills 10 and 11 are shifted slidingly towards the inside of the recess 9 in the casing. The chills move thus nearer each other and simultaneously the end of the punch 22 enters the housing 20; when the chills 10 and 11 bear against the bottom of the recess 9, their cooperating surfaces 16 are brought into contacting relationship, the punch 22 being then at the end of its inward stroke; the injection channel is now opened during the time required for injection and closes again. Lastly, the punch 22 and the pusher member 19 are urged back in a direction opposed to that of the arrow 26, after release of the hydraulic press, under the action of the springs 5 acting on the intermediate member 4. Simultaneously, the springs 14 urge the chills 10 and 11 apart so that the latter slide over the sloping wall 13 of the casing, whereby the molded article 23 is automatically set free.

In a modification, there are provided two springs 5 between the member 4 and the casing section 2 instead of four.

What we claim is:

1. A molding apparatus comprising a casing including an end wall having a port therein for receiving molding material and a plurality of inclined surfaces disposed adjacent thereto within said casing, a member mounted within said casing for sliding movement toward and away from said end wall, said member having a mold cavity section therein and adapted to be moved toward said end wall by a ram movable through said casing, an expansible mold comprising a plurality of cooperating chill sections mounted within said casing between said member and said end wall for movement toward and away from each other in a direction transverse to the direction of movement of said member, each of said chill sections including an inclined surface in engagement with a cooperating inclined surface within said casing and a cooperating mold cavity section, said chill sections being movable into engagement with each other and to said end wall in response to movement of said member by said ram whereby the mold cavity sections of said chill sections cooperate to form a mold cavity section communicating with said port and the mold cavity section of said member.

2. A molding apparatus as defined in claim 1 wherein said casing includes an opposite end wall provided with an opening for receiving said ram, and wherein said member is spring urged into engagement with said opposite end wall and includes a portion enclosing said opening for engagement by said ram.

3. A molding apparatus as defined in claim 1 wherein said chill sections are spring urged away from each other.

4. A molding apparatus as defined in claim 1 wherein the mold cavity section formed by the cooperating mold cavity sections of said chill section is threaded.

5. Apparatus for forming a threaded head piece on a tubular element comprising a casing having a port for receiving molding material, a member mounted in said casing for movement toward and away from said port, said member having a mold cavity section therein, a plurality of chill sections mounted in said casing between said port and said member for movement toward and away from each other in a direction transverse to the direction of movement of said member, said chill sections together defining a threaded mold cavity section adapted to communicate with said port and the mold cavity section of said member, a die member for entry within said mold cavity sections, said die member being adapted to carry a tubular element, means for moving said die member and tubular element into the mold cavity section of said member and for moving said member toward said port, and means within said casing responsive to the movement of said member toward said port for moving said chill sections toward each other whereby said mold cavity sections, said die member and said tubular element cooperate to form a mold cavity conforming with the shape of the desired threaded head piece.

References Cited in the file of this patent

UNITED STATES PATENTS

| | | |
|---|---|---|
| 2,358,857 | Gits | Sept. 26, 1944 |
| 2,587,070 | Spillman | Feb. 25, 1952 |

FOREIGN PATENTS

| | | |
|---|---|---|
| 502,795 | Belgium | May 15, 1951 |
| 546,976 | Germany | Mar. 19, 1932 |
| 270,613 | Sweden | Dec. 1, 1950 |